(12) United States Patent
Silbernagel

(10) Patent No.: US 8,056,695 B2
(45) Date of Patent: Nov. 15, 2011

(54) ADAPTIVE SOFT START SYSTEM FOR MOWER BLADE CLUTCH ENGAGEMENT

(75) Inventor: Carl S. Silbernagel, Fort Mill, SC (US)

(73) Assignee: Deere & Company, Moline, IL (US)

( * ) Notice: Subject to any disclaimer, the term of this patent is extended or adjusted under 35 U.S.C. 154(b) by 699 days.

(21) Appl. No.: 12/170,567

(22) Filed: Jul. 10, 2008

(65) Prior Publication Data
US 2010/0005768 A1 Jan. 14, 2010

(51) Int. Cl.
F16D 19/00 (2006.01)
F16D 27/00 (2006.01)
F16D 37/02 (2006.01)

(52) U.S. Cl. .......... 192/84.1; 701/22

(58) Field of Classification Search ......... 192/84.1, 192/18 A, 82 T, 18 R, 85.23, 103 R, 84.961; 701/22, 50; 340/684; 123/406.23, 403; 180/65.265, 180/271; 56/11.8, 14.7, 10.2 R, 10.2 G
See application file for complete search history.

(56) References Cited

U.S. PATENT DOCUMENTS

| | | | | |
|---|---|---|---|---|
| 4,160,498 A * | 7/1979 | Newton et al. | .......... | 192/84.961 |
| 4,526,257 A * | 7/1985 | Mueller | .......... | 192/48.2 |
| 4,609,965 A * | 9/1986 | Baker | .......... | 361/160 |
| 4,620,261 A * | 10/1986 | Thornton | .......... | 361/154 |
| 4,635,774 A * | 1/1987 | Sekiguchi et al. | .......... | 192/52.2 |
| 4,649,458 A * | 3/1987 | Arai et al. | .......... | 361/152 |
| 4,679,116 A * | 7/1987 | Oshizawa et al. | .......... | 361/154 |
| 4,723,644 A * | 2/1988 | Sakakiyama | .......... | 477/175 |
| 4,734,817 A * | 3/1988 | Baker et al. | .......... | 361/190 |
| 4,749,073 A * | 6/1988 | Olsen | .......... | 192/52.5 |
| 4,805,751 A * | 2/1989 | Ohkumo et al. | .......... | 477/176 |
| 4,928,458 A | 5/1990 | Muroya et al. | | |
| 4,977,988 A * | 12/1990 | Tanaka | .......... | 477/87 |
| 5,094,332 A | 3/1992 | Wall | | |
| 5,529,028 A * | 6/1996 | Weikert | .......... | 123/41.12 |
| 5,628,390 A * | 5/1997 | Richardson et al. | .......... | 192/84.1 |
| 5,937,622 A * | 8/1999 | Carrier et al. | .......... | 56/11.9 |
| 6,109,009 A * | 8/2000 | Benson | .......... | 56/10.2 G |
| 6,397,995 B1 * | 6/2002 | Ellsworth et al. | .......... | 192/54.1 |
| 6,460,670 B2 | 10/2002 | Schaedler | | |
| 6,929,580 B2 * | 8/2005 | Frotscher | .......... | 477/76 |
| 7,266,938 B1 | 9/2007 | Hauser et al. | | |
| 2007/0125341 A1* | 6/2007 | Tamamoto et al. | .......... | 123/406.23 |
| 2007/0272510 A1* | 11/2007 | Kawakami | .......... | 192/215 |
| 2007/0273152 A1* | 11/2007 | Kawakami et al. | .......... | 290/17 |
| 2009/0065273 A1* | 3/2009 | Wyatt et al. | .......... | 180/65.8 |
| 2009/0277743 A1* | 11/2009 | Park et al. | .......... | 192/84.1 |
| 2010/0125384 A1* | 5/2010 | Wyatt et al. | .......... | 701/22 |
| 2010/0206647 A1* | 8/2010 | Ishii et al. | .......... | 180/6.24 |
| 2010/0275564 A1* | 11/2010 | Baeta et al. | .......... | 56/11.9 |
| 2011/0056177 A1* | 3/2011 | Goto | .......... | 56/14.7 |

FOREIGN PATENT DOCUMENTS
EP 0154230 9/1985
* cited by examiner

*Primary Examiner* — Arpad Fabian-Kovacs

(57) ABSTRACT

An adaptive soft start system for mower blade clutch engagement includes an engine speed sensor providing engine speed inputs to a microcontroller that provides electrical power to an electromagnetic clutch for engaging an engine to at least one mower blade. The microcontroller repeatedly computes the rate of change of engine speed during mower blade clutch engagement and modulates the electrical power to the electromagnetic clutch each time the rate of change of engine speed is outside minimum or maximum thresholds.

17 Claims, 4 Drawing Sheets

ADAPTIVE SOFT START SYSTEM FOR MOWER BLADE CLUTCH ENGAGEMENT

FIELD OF THE INVENTION

This invention relates to mowing machines for cutting grass and other vegetation, and more specifically to electromagnetic clutches for transmission of power from a lawn mower engine to one or more mower blades.

BACKGROUND OF THE INVENTION

Electromagnetic clutches typically are used to transmit power from a lawn mower engine to two or more cutting blades mounted on spindles under a mower deck. The electromagnetic clutches are designed to engage very quickly to minimize clutch plate wear. However, a disadvantage of the sudden engagement is that engine speed may droop. As a result, the mower deck may vibrate and shake until the rotational speed of the blades and spindles increases sufficiently.

Soft engagement electronic control systems or modules have been proposed that are intended to reduce the suddenness of the clutch engagement, by modulating the voltage applied to the electromagnetic coils. The soft engagement should allow the clutch plates to slip for a longer period while reducing engine droop and other undesirable characteristics of a hard start.

For example, U.S. Pat. No. 5,094,332 relates to a soft start controller for regulating the engagement and disengagement of an electromagnetic clutch. A microprocessor may be programmed to regulate the current controller such that the electrical current which is supplied to the clutch during the engagement process follows a selected one of three clutch energizing current curves, or any other curve which may be programmed into the memory circuit. The microprocessor is programmed to select one of the curves before the engagement sequence begins in response to the status of one or more parameters sensed by sensors such as a speed sensor, temperature sensor, engine vacuum sensor and level sensor.

However, conditions may change once the operator actuates the clutch engagement control and as the clutch moves into engagement. For example, the amount of grass and debris buildup under the mower deck may change, and there may be swings in engine power, during the engagement process. Additionally, clutch face wear and belt wear may change the engagement dynamics. As a result, a clutch energizing curve selected at initiation of engagement may no longer be desirable or optimal. None of the programmed clutch energizing curves may be optimal for a particular engine and mower deck, especially after they are subject to wear from use. Further, the programmed set of clutch energizing curves may not be suitable for all combinations of mower deck widths and engines. A soft start system that may be optimal for one mower under one set of conditions may not produce the same desired outcome under different conditions, on a different model, or on a mower with a different mower deck and engine configuration.

A soft start system for clutch engagement is needed that adapts if conditions change while the clutch moves into engagement. A soft start system for clutch engagement is needed that can adapt to provide an optimal clutch energizing curve for a particular mower deck and engine after they are subject to wear from use or other factors that could affect the engagement dynamics. A soft start system for clutch engagement is needed that can adapt so that it is suitable for many different combinations of mower deck widths and engine configurations. A soft start system is needed that may be adapted to mowers under any set of conditions, and for mowers having various different mower deck and engine configurations.

SUMMARY OF THE INVENTION

An adaptive soft start system for mower blade clutch engagement includes a microcontroller that monitors electrical current of an electromagnetic mower blade clutch and determines if there is a drop in current. Once a current drop is sensed, indicating initial contact between the clutch surfaces, the microcontroller begins measuring engine speed and computing engine speed slope as the clutch plates move toward full engagement. During this period of engagement, the microcontroller repeatedly determines if engine speed slope is within a minimum threshold and a maximum threshold, or if engine speed is outside an acceptable range. The microcontroller modifies power supplied to the electromagnetic mower blade clutch each time the engine speed slope is outside the minimum and maximum thresholds, or if engine speed is outside the acceptable range.

The adaptive soft start system for clutch engagement adapts if conditions change while the clutch moves into engagement, and adapts to provide an optimal clutch energizing curve for a particular mower deck and engine after they are subject to wear from use or other factors that could affect the engagement dynamics. The adaptive soft start system can adapt so that it is suitable for many different combinations of mower deck widths and engine configurations, to mowers under any set of conditions, and to mowers having various different mower deck and engine configurations.

DESCRIPTION OF THE PREFERRED EMBODIMENT

Figure 1:
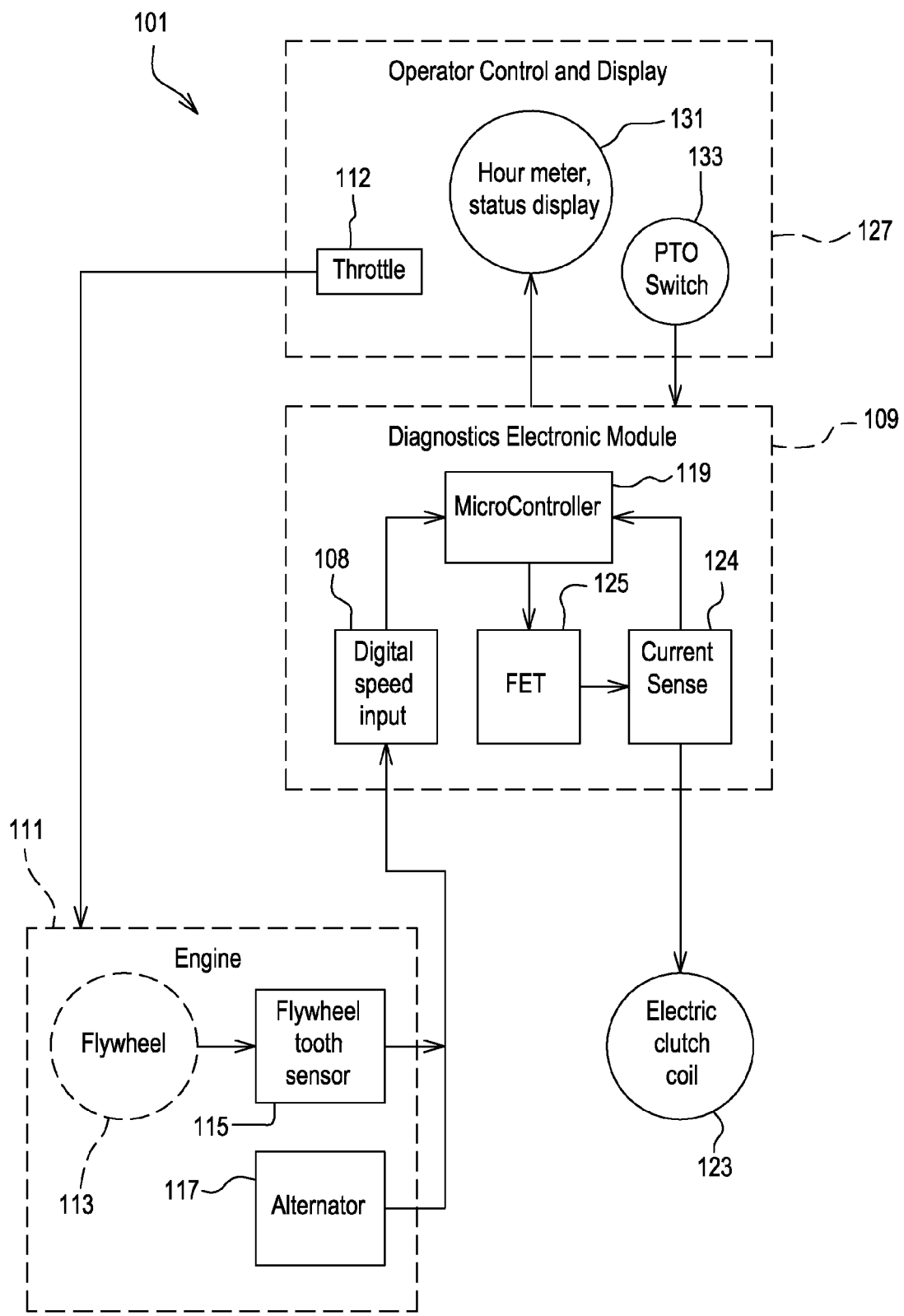
FIG. 1 is a block diagram of an adaptive soft start system for mower blade clutch engagement according to a first embodiment of the invention.

In one embodiment, as shown in FIG. 1, adaptive soft start system 101 is provided for a counter-rotating, side discharge or rear discharge/rear collection mower deck. The mower deck may be used with a variety of different riding vehicles or walk-behind mowers, and in a variety of different mower configurations. For example, one, two, or more decks may be attached to a vehicle. The mower deck may be a two-chamber deck; i.e., with two cutting blades and spindles; and may be positioned at or adjacent the front, middle, or rear of the vehicle. However, in an alternative embodiment, the mower deck may have three or more chambers, each chamber having a cutting blade attached to a spindle.

In one embodiment, adaptive soft start system 101 utilizes one or more sensors of operating conditions of a mower that provide input to microcontroller 119 in diagnostics control module 109 to determine the optimal process for mower blade clutch engagement. The mower operating conditions are detected by sensors to indicate if the engine speed, and the rate of change of engine speed, is outside threshold values.

The microcontroller may apply the input from one or more sensors to preprogrammed software logic that performs certain steps during a time period after operator actuation of PTO switch 133. After the operator actuates PTO switch 133 to provide electric power to electric clutch coil 123, and the mower blade clutch plates come into initial contact, the microcontroller begins comparing the sensor inputs to certain threshold values, and repeats the comparison until clutch engagement is complete. During this period of engagement, if the microcontroller determines that engine speed, or the rate of change of engine speed, is decreasing more than a specified threshold value, the microcontroller provides a signal to FET 125 to modulate voltage or current to electric clutch coil 123 to slow or delay clutch engagement. Similarly, during the period of engagement, if the microcontroller determines that engine speed has drooped less than a specified threshold, the microcontroller provides a signal to FET 125 to modulate voltage or current to electric clutch coil 123 to hasten clutch engagement.

In one embodiment, adaptive soft start system 101 repeatedly senses the rotational speed of internal combustion engine 111 or other power source. For example, the rotational speed of engine flywheel 113 may be sensed by flywheel gear tooth sensor 115. The flywheel tooth sensor may be electrically connected to digital speed input 108 of the diagnostics control module. The flywheel tooth sensor may produce pulses indicative of the rotational speed of the engine. The microcontroller then repeatedly determines if the rotational speed and/or slope of the rotational speed of the flywheel tooth sensor are within specified threshold values.

Alternatively, the adaptive soft start system may sense the rotational speed of alternator 117. The alternator may be electrically connected to digital speed input 108 of the diagnostics control module, and may produce pulses similar to the engine speed sensor. The microcontroller determines if the rotational speed and/or slope of the rotational speed of the alternator are within specified threshold values.

The microcontroller may apply the input from the engine speed sensor, either the flywheel tooth sensor or alternator, to preprogrammed software logic that performs certain steps in a real time closed loop feedback process to modulate or control the electrical power which provides the clutch engagement force.

Figure 4:
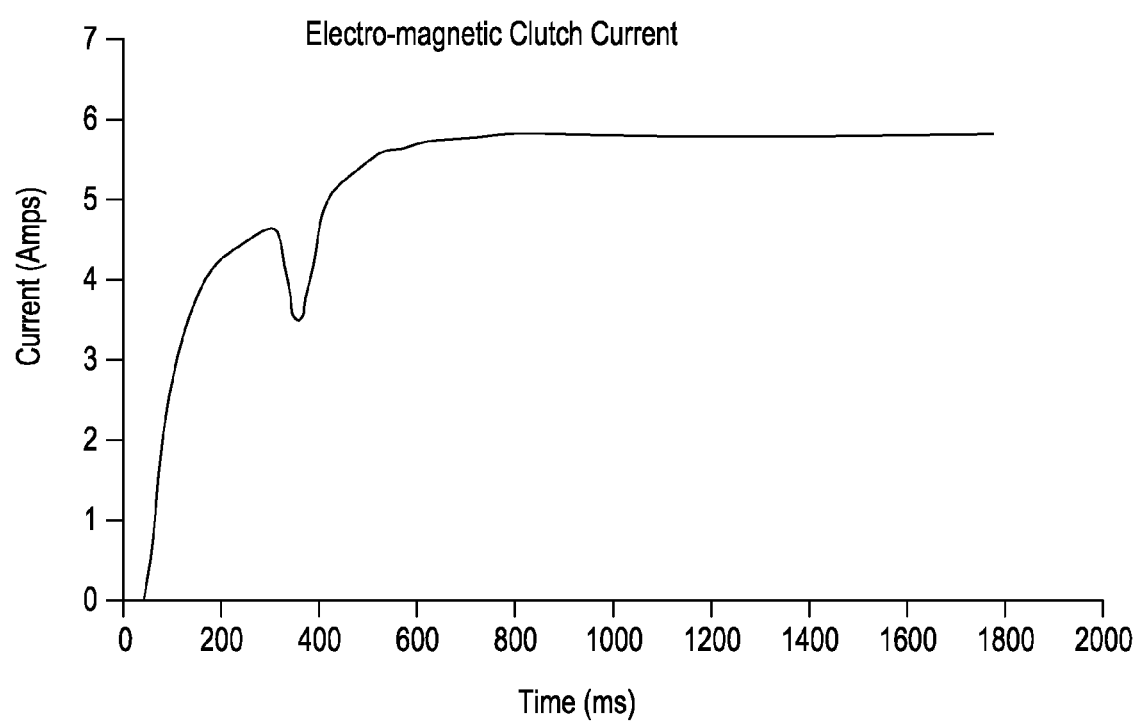
FIG. 4 is an electromagnetic clutch current curve showing the current as a function of time during a typical engagement of a mower blade clutch.

In one embodiment, the adaptive soft start system runs when the operator actuates PTO switch 133 to provide electrical power to electric clutch coil 123 for engaging the mower blade clutch. The microcontroller may be an 8 bit controller with "capture" capability that allows the microcontroller to accurately measure the time between pulses in a pulse train from an engine flywheel sensor or alternator coils. The microcontroller provides an output to FET 125 which provides the appropriate power to the electric clutch coil to engage or disengage the electromagnetic clutch based on the digital input from the sensors. Clutch current sensor 124 also may be connected to the electric clutch coil to provide current input to the microcontroller. As shown in FIG. 4, an initial drop in clutch current, which may be within about 300 ms to 500 ms after the operator actuates the PTO switch, indicates initial contact between the clutch plates.

In one embodiment, operator control and display 127 may include throttle control 112 which may be mechanically or electromechanically linked to engine 111 to increase or decrease the fuel supply to the engine and thereby increase or decrease engine speed. The operator control and display also may include hour meter and status display 131 which may be electrically connected to diagnostics electronic module 109 to provide cumulative running time of the engine and show if the PTO is presently engaged or disengaged. Additionally, the operator control and display may include PTO switch 133 which may be electrically connected to the diagnostics electronic module and may be used by the operator to initiate control logic for providing power to the electric clutch coil.

In one embodiment, control logic in microcontroller 119 may detect if the engine speed and/or the rate of change of engine speed are within specified thresholds. Additionally, the microcontroller may be electrically connected to PTO switch 133 to determine if the PTO is actuated or not, and also may include a timer.

Figure 3:
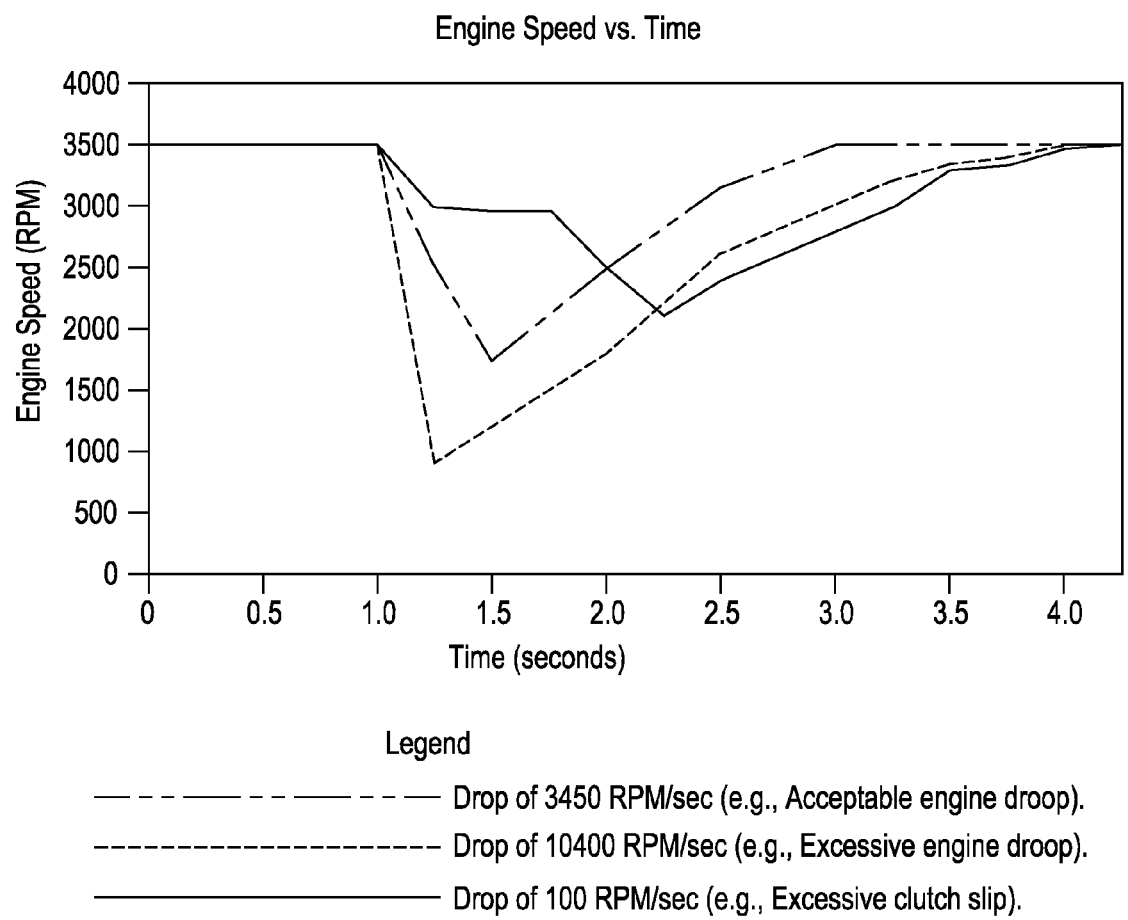
FIG. 3 is a graph of engine speed in relation to time after actuation of a PTO switch of a typical mower deck.

FIG. 3 shows several examples of the droop in engine speed following actuation of the PTO switch. For example, the engine speed may begin to droop about one second after the operator actuates the PTO switch, which is when the clutch plates begin to contact each other. The dashed line in FIG. 4 indicates engine droop exceeding a maximum threshold of minus 10,000 rpm per second, while the solid line shows engine droop less than a minimum threshold of minus 2000 rpm per second. The partially dashed line represents an engine speed within the threshold slope values.

Additionally, FIG. 3 shows an increase of engine speed achieved with implementation of the adaptive soft start system. Specifically, in the case of the engine droop exceeding the maximum threshold, the adaptive soft start system modulates the voltage or current to the electric clutch coil to delay engagement of the clutch plates and thereby increase engine speed. In the case of the engine droop, the present invention causes a decrease of engine speed by expediting engagement of the clutch plates. The adaptive soft start system repeats this iterative process until mower blade clutch engagement is complete.

Figure 2:
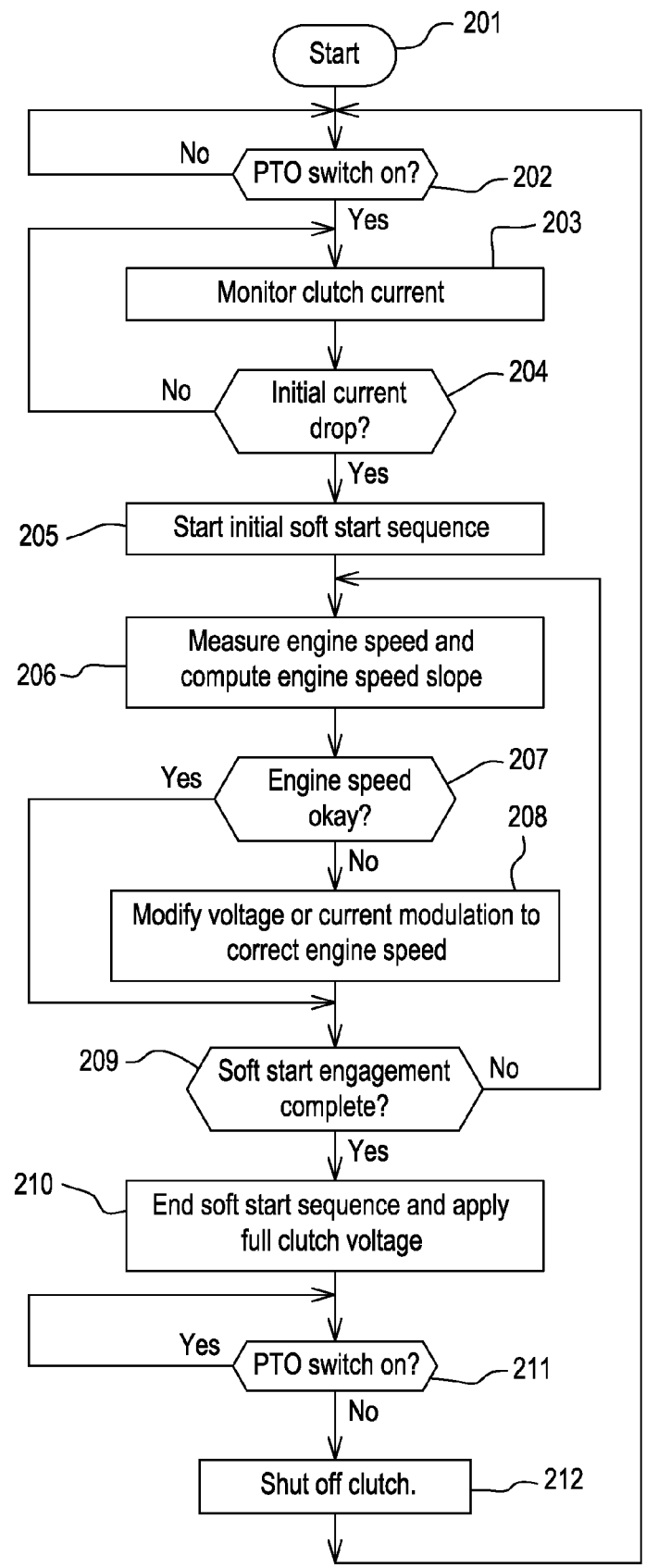
FIG. 2 is a logic diagram of an adaptive soft start system for mower blade clutch engagement according to a first embodiment of the invention.

In one embodiment, as shown in the logic diagram of FIG. 2, the adaptive soft start system logic begins in block 201 when electrical power is provided to the microcontroller. In block 202, the microcontroller reads if the PTO switch is actuated to initiate the clutch engagement process. Once the PTO switch is actuated, the microcontroller begins monitoring the clutch electrical current as shown in block 203. If the PTO switch is not actuated, the microcontroller again reads the PTO switch on/off state in block 202.

In one embodiment, in block 204, the microcontroller reads if there is an initial drop in the electromagnetic clutch current after the PTO switch is on. Typically, a primary current increase occurs during engagement of the electromagnetic clutch, immediately before the initial drop. As shown in FIG. 4, the initial drop may be a current valley indicating armature pull-in, or initial contact of the clutch plates. The initial drop may be used as a trigger for the initial adaptive soft start sequence starting in block 205. The adaptive soft start logic typically may run at each clock cycle of the microcontroller for a total elapsed time of about one second after the current drop sensed in block 204.

In one embodiment, in block 206, the microcontroller begins sensing and measuring absolute engine speed, and computing engine speed slope. An engine speed sensor such as a flywheel gear tooth sensor or alternator may provide engine speed to the microcontroller.

In block 207, the microcontroller may determine if the engine droop, and/or absolute engine speed, are within certain specified threshold values. For example, the microcontroller may sense if the engine droops at a rate of more than a preset threshold rate such as a droop of 10,000 rpm per second. Additionally, the microcontroller may sense if the absolute engine speed drops below a desired threshold such as 1200 rpm. The microcontroller also may sense if engine speed is drooping too slowly (or flatly) during clutch engagement, such as a droop of under 2000 rpm per second.

In one embodiment, in block 208, if the microcontroller determines engine speed has drooped more than the threshold, or absolute engine speed has dropped below the desired threshold, the microcontroller may modify the voltage modulation to the electromagnetic clutch to correct the engine speed error.

For example, in FIG. 3, an engine droop of 10,400 rpm per second is represented as a dashed line. The engine speed slope is more than a threshold droop rate such as 10,000 rpm per second, so the microcontroller may decrease a pulse width modulation (PWM) duty cycle to decrease the electromagnetic clutch clamp force, allowing the opposing clutch faces to slip. Similarly, if absolute engine speed drops below a threshold such as 1200 rpm, the microcontroller also may decrease the PWM duty cycle to decrease clutch clamping force and allow the clutch faces to slip.

For example, the microcontroller may use a PID (proportional, integral, derivative) control scheme which would update the PID constants during each loop of the program. As a result, as soon as the microcontroller receives and evaluates the engine speed information, it would appropriately change the PID constants.

Additionally, in block 208, if the microcontroller determines engine speed has dropped too slowly, indicating excessive clutch slip, the microcontroller may be programmed to supply more clutch power by modulating the voltage or current differently and increasing the clutch clamping force. For example, in FIG. 3, the solid line represents an engine droop of 100 rpm per second, which is less than the threshold of 2000 rpm per second. As a result, the microcontroller may increase the PWM duty cycle to increase the clutch clamp force, allowing the clutch faces to grip more tightly.

In one embodiment, a PID control scheme also may be used to control this engagement process. The control scheme may be iterative. For example, it may start out with an assumed value, measure the response, calculate the error compared to the target, and change the control parameter and repeat the process.

In one embodiment, after the microcontroller modifies the voltage or current modulation to correct engine speed in block 208, or if the microcontroller has determined that engine speed and/or rate of change of engine speed was within the specified thresholds, the microcontroller checks if soft start engagement is complete in block 209. The microcontroller may determine soft start engagement is complete by measuring when a specific time period has elapsed, such as one second, after starting the initial soft start sequence in block 205.

Alternatively, the microcontroller may determine soft start engagement is complete in block 209 by sensing a steady state current through the electromagnetic clutch, as shown in the electromagnetic clutch current diagram of FIG. 4. The steady state current may follow a secondary current increase from the current valley which triggered the soft start sequence.

If the microcontroller determines soft start engagement is incomplete, the logic returns to block 206 to measure engine speed and calculate engine speed slope again, and determining if the engine speed and/or slop are within the thresholds. The microcontroller repeats the process until soft start engagement is complete. If the microcontroller determines that soft start engagement is complete, it ends the soft start sequence and applies full power to the mower blade clutch in block 210.

In one embodiment, the microcontroller continues to check if the PTO switch is actuated in block 211. If the microcontroller determines the PTO switch is not actuated, power to the clutch is shut off in block 212 and the logic returns to block 202.

In one embodiment, the adaptive soft start system of the present invention allows significant variability each time the operator engages the mower blade clutch, and is not limited to only a specified number of different clutch engagement sequences. Additionally, the same adaptive soft start system and module may be used across a wide range of mower models and configurations so that each machine may have desirable clutch engagement characteristics.

Having described the preferred embodiment, it will become apparent that various modifications can be made without departing from the scope of the invention as defined in the accompanying claims.

The invention claimed is:

1. An adaptive soft start system for mower blade clutch engagement, comprising:
    an engine speed sensor providing engine speed inputs to a microcontroller that provides electrical power to an electromagnetic clutch for engaging an engine to at least one mower blade;
    wherein the microcontroller repeatedly computes the rate of change of engine speed during mower blade clutch engagement and modulates the electrical power to the electromagnetic clutch each time the rate of change of engine speed is outside a threshold.

2. The adaptive soft start system of claim 1 wherein the engine speed sensor is a flywheel tooth sensor.

3. The adaptive soft start system of claim 1 wherein the engine speed sensor is an alternator.

4. The adaptive soft start system of claim 1 wherein the engine speed sensor provides a digital speed input to the microcontroller.

5. The adaptive soft start system of claim 1 further comprising a maximum rate of change threshold and a minimum rate of change threshold.

6. The adaptive soft start system of claim 1 further comprising a current sensor providing a clutch current input to the microcontroller.

7. The adaptive soft start system of claim 6 wherein the microcontroller monitors clutch current and begins computing the rate of change of engine speed after an initial clutch current drop.

8. An adaptive soft start system for mower blade clutch engagement, comprising:
    a microcontroller receiving engine speed inputs from an engine speed monitor, determining if each engine speed input is between a minimum threshold and a maximum threshold, and changing an electrical input to the mower blade clutch each time the engine speed is outside the minimum or maximum thresholds until the mower blade clutch is fully engaged.

9. The adaptive soft start system of claim 8 wherein the microcontroller uses a plurality of engine speed inputs to compute an engine speed slope.

10. The adaptive soft start system of claim 8 wherein the microcontroller changes a voltage modulation to the mower blade clutch if the engine speed is outside the minimum or maximum thresholds.

11. The adaptive soft start system of claim 8 wherein the microcontroller monitors an electrical current to the mower blade clutch.

12. The adaptive soft start system of claim 11 wherein the microcontroller determines if the engine speed is between the minimum and the maximum thresholds and changes the electrical input to the mower blade clutch after an initial drop of the current to the mower blade clutch.

13. An adaptive soft start system for mower blade clutch engagement, comprising:
- a microcontroller that monitors electrical current of an electromagnetic mower blade clutch and determines if there is a drop in current;
- if there is a drop in current, measures engine speed and computes engine speed slope;
- determines if engine speed slope is within a minimum threshold and a maximum threshold; and
- modifies power supplied to the electromagnetic mower blade clutch if the engine speed slope is outside the minimum or maximum thresholds.

14. The adaptive soft start system of claim 13 wherein the microcontroller measures engine speed with a flywheel tooth sensor and a digital speed input.

15. The adaptive soft start system of claim 13 wherein the microcontroller measures engine speed with an alternator and a digital speed input.

16. The adaptive soft start system of claim 13 wherein the microcontroller applies full power to the electromagnetic clutch after a predetermined time period.

17. The adaptive soft start system of claim 13 wherein the microcontroller applies full power to the electromagnetic clutch once clutch current reaches a predetermined value.

* * * * *